April 7, 1964  L. H. JOHNSON  3,127,931
HEATING AND COOLING EMPLOYING AERATED CAR SEATS
Filed May 4, 1959  2 Sheets-Sheet 1

INVENTOR.
Laurence H. Johnson
BY George E. Johnson
ATTORNEY

April 7, 1964     L. H. JOHNSON     3,127,931
HEATING AND COOLING EMPLOYING AERATED CAR SEATS
Filed May 4, 1959     2 Sheets-Sheet 2
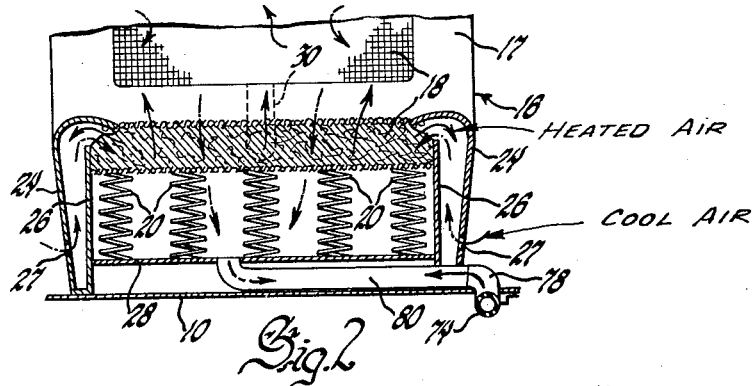
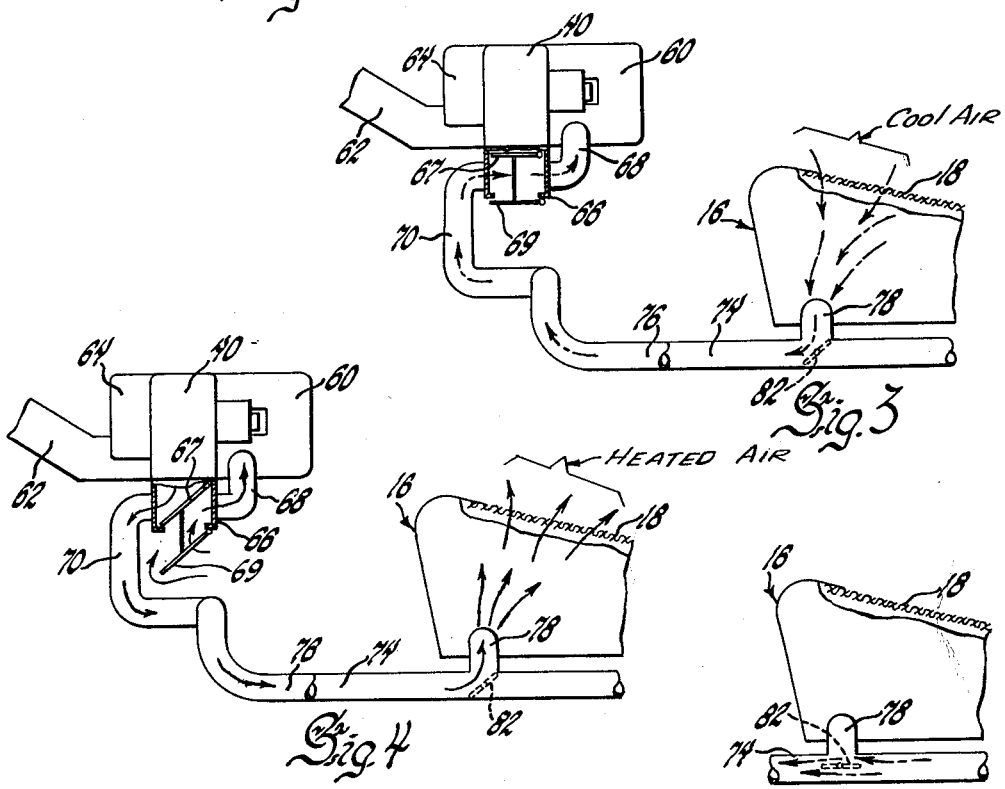
INVENTOR.
*Laurence H. Johnson*
BY *George E. Johnson*
ATTORNEY United States Patent Office 3,127,931
Patented Apr. 7, 1964

3,127,931
HEATING AND COOLING EMPLOYING
AERATED CAR SEATS
Laurence H. Johnson, Buffalo, N.Y., assignor to General
Motors Corporation, Detroit, Mich., a corporation of
Delaware
Filed May 4, 1959, Ser. No. 810,659
3 Claims. (Cl. 165—43)

This invention relates to systems for and methods of promoting the comfort of vehicle passengers and more particularly to systems for and methods of heating and cooling automobile passengers through the use of air permeable car seats.

It will be readily understood that a control of temperature of the immediate environment of an automotive seat should be a most effective expedient in improving the body comfort of a person occupying the seat. In automobiles, as made up to the present, it has been most difficult satisfactorily to heat or cool occupant body areas adjacent or contacting the surface of the seat. If heat is to be supplied, then provision must be made to effect proper heat distribution. This may be done quite readily with the solving of relatively minor problems but if the seat temperature is to be lowered as by introducing cooled air into the seat, then serious difficulties arise. Experiments carried out prior to the present invention have amply demonstrated that the forcing of cooled air guided from an evaporator of an air conditioning system into seat cushions for ejection therefrom into the passenger compartment does not enhance body comfort. An automobile passenger sitting in such a seat quickly discovers that the cooling effect is not pleasant but should be avoided. The experiments have indicated that such cooling will make a person ill as the cooling is entirely too drastic at least in part because of the intimate contact of the cooled air with the body of that person.

It has now been found that aerated automobile seats may be advantageously employed for heating and cooling without experiencing the drastic effects as above mentioned. This advantageous heating and cooling may be done with the employment of a new method herein disclosed and which method may be practiced using a novel and simple duct and valve arrangement. The method and arrangement are two aspects of the present invention although the cooling aspect is more related to the method than to the specific arrangement which pertains to either cooling or heating.

To these ends, an object of the present invention is to provide a system for and method of heating and cooling employing seats and in the use of which a drastic cooling effect on the seat occupant or occupants is avoided. Another object is to provide a system and method for enhancing the comfort of a passenger by cooling an automobile seat to attain a temperature required without objectionably chilling the occupant. Another object is to provide a method of cooling a seated person by drawing body perspiration or moisture from the latter without chilling.

A feature of the invention is a cooling system in which blower means is arranged to cause cooled air to flow in such a direction that it first contacts the clothing or person of a seat occupant and then enters the seat interior. Another feature of the invention is a heating and cooling system in which blower means and ducts are employed to force heated air out from a permeable seat and into the environment of an occupant of the seat or force cooled air from around the occupant to the seat interior. Another feature is a method of drawing cooled air from a general environment into contact with the body or clothing of a seat occupant and then into the seat for guidance away from the occupant.

These and other important features of the invention will now be described in detail in the specification and then pointed out more particularly in the appended claims.

In the drawings:

FIGURE 2 is a sectional and diagrammatic view through the seat of FIGURE 1 looking toward the rear of the vehicle and showing a portion only of the back rest part of the seat;

FIGURE 3 is a diagrammatic view of the heating and cooling system showing the direction of flow given cooled air in practicing the present invention;

FIGURE 4 is a view similar to that of FIGURE 3 but illustrating the direction of the air flow during heating;

FIGURE 5 is a diagrammatic representation of the seat in FIGURE 3 with a valve positioned to bypass the seat when too cold a condition obtains;

FIGURE 6 is a view similar to that of FIGURE 5 but showing the direction of air flow when the seat is too warm; and FIGURE 7 is a view similar to that of FIGURE 5 or FIGURE 6 but showing the arrangement during operation of the evaporator for cooling with no circulation through the seat or for full windshield defogging when the heater is in operation.

Figure 1:
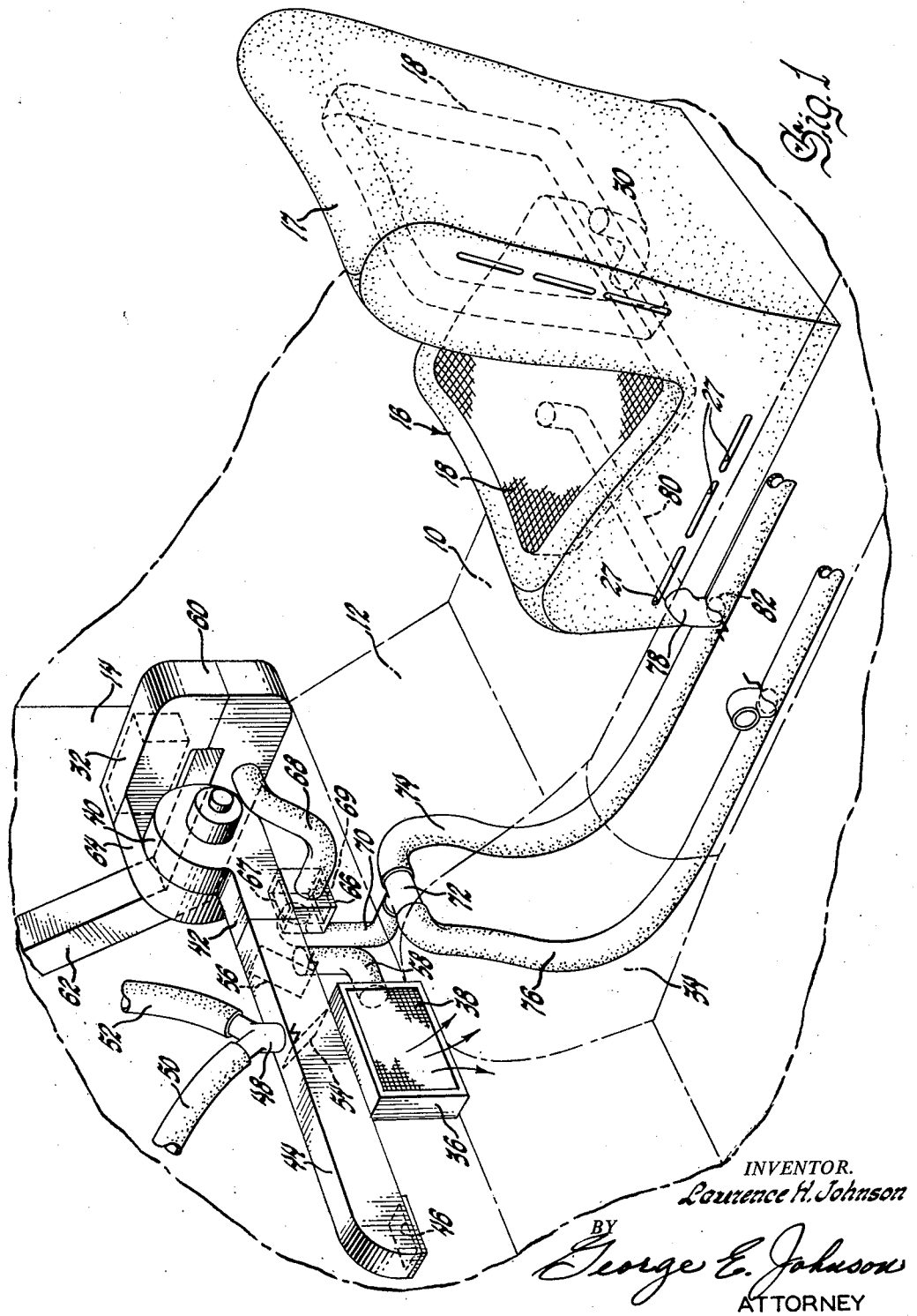
FIGURE 1 is a perspective and diagrammatic view of a portion of an automobile interior showing a combination heating and cooling system as associated with a passenger seat located in the front portion of that interior.

In FIGURE 1, the floor 10, toeboard 12 and fire wall 14 are depicted as the locale whereon the main components are supported. A passenger seat 16 is shown, this seat being composed of the seat proper and back portion 17 made of permeable materials 18 properly supported by means such as springs 20. The outside panels 24, as well as the inside panels 26, at each side of the seat is made of flexible sheet material although it will be understood that the variations in this respect may be numerous without departing from the present invention. Each panel 24 is provided with a restrictive orifice 27. A horizontal partition 28 is formed in the seat and is spaced slightly above the floor 10 to support the springs 20. The permeable material 18 in the back portion 17 of the seat is connected by means of an elbow 30 to the permeable material in the seat proper so that the interstices in the permeable materials of both portions of the seat are in free communication.

A heater 32 is located in the vicinity of the fire wall 14. This heater constitutes a conventional core which receives heat by way of circulation of the engine coolant as is well known. Immediately above the transmission tunnel 34 and attached to the rear side of the fire wall 14 is an evaporator 36. The latter includes a core 38 which is supplied with refrigerant as is conventional and when cooling is desired. A blower 40 is located immediately to the rear of the fire wall 14 and the air discharge end of the blower casing is shown at 42. It communicates with a distribution manifold 44 extending parallel with the fire wall 14. A horizontal opening 46 is formed in the lower side and at the left end of the manifold 44. A Y-connection 48 communicates with an intermediate portion of the top side of the manifold 44 and is connected to two flexible conduits 50 and 52 which lead to windshield defroster nozzles as is conventional. A valve 54 is mounted in the manifold 44 to control the passage through the Y-connection 48 as well as to control flow through the opening 46. Another valve 56 is located in the manifold 44 to control air passage through an elbow conduit 58 which is adapted to conduct air to the evaporator core 38 for subsequent discharge into the passenger compartment.

The heater 32 is enclosed within the upper leg of a U-shaped duct portion 60. The other or lower leg of this portion communicates with the outside air inlet conduit 62 which leads to some portion of the vehicle such as the area immediately forward of the windshield preferably but not necessarily to receive outside air by ram effect. The upper leg of the portion 60 is connected by a short duct 64 to the inlet of the blower 40.

A valve box 66 is suspended beneath the blower portion 42 and its rear is connected to the duct portion 60 by a conduit 68. The box contains valves 67 and 69. The forward side of the box 66 is connected by means of a conduit 70 to a T member 72, the opposed ends of which are connected by conduits 74 and 76 to the front seats. As the connections to the front seats are the same, they are shown in the drawings as applied for the right-hand seat only although FIGURE 1 shows the conduits 74 and 76 as extending along opposite sides of the tunnel 34 and beneath the floor 10.

The conduit 74 continues from under the front seat 16 and is in open communication with the passenger compartment to the rear of that seat. It will be understood that this conduit need not be open but could be connected to a rear seat in the same way as it is connected to the front seat. The connection to the front seat is by way of an elbow 78 and a conduit 80 which has one end in communication with the space of the seat in which the springs 20 are located. A control of the passage through the elbow 78 and the conduit 80 or the passage to the back seat may be had by means of a valve 82. As in the case of all the valves of the system, it is provided with a crank which may be actuated manually or by power such as by vacuum from the engine manifold.

From the above, it may be understood that air flow through the permeable material 18 of the seat 16 may be invoked by way of the blower 40 and the choice of pressure or suction on the air in the seat is attained by proper valve manipulation. In the drawings, solid arrows are used to indicate the flow of heated air and dash line arrows indicate cool air flow.

Assuming that a cooling effect is desired and heat is not being introduced into the heater 32 but refrigerant vapor is being passed through the evaporator core 38, the valves 67, 69 and 82 are positioned as shown in FIGURE 3 and a suction on the cushion of the seat is created by action of the blower 40. As a consequence, perspiration or moisture is drawn from the person of the seat occupant and is withdrawn by the flowing air into the seat to enhance the cooling effect upon that occupant. It will be understood that under certain conditions, the limited cooling effect of this moisture withdrawal, especially when humidity is low, may eliminate the need for operation of the refrigeration elements but under more difficult conditions, of course, operation of the evaporator insures adequate cooling. If desired, the side ports 27 in the seat panels 24 are employed partially to bypass the seat but whether such ports be used or not, the general circulation of the cooled air in the passenger compartment prior to its withdrawal from the general environment of the seat occupant by way of the seat eliminates any drastic chilling effect.

If desired during cooling, the seat may be bypassed completely by changing the position of the valve 82 as shown in FIGURE 5.

For the other operation, that of heating, the seat 16 may be pressurized by discharging air from the heater 32 which is heated, as by engine coolant, and forcing that air into the seat by way of the conduit 74 with the valves 67, 69 and 82 positioned as shown in FIGURE 4. The heated air will go upwardly through the cushion and permeate both sections of the seat and be discharged around the seat occupant. Part of the air will escape through the ports 27 in the side panels 24 for more general circulation in the event such circulation is desired. The valve 69, being open, permits recirculation of the air. The degree of heat conveyed through the seat cushions may be further regulated by adjusting the valves. If the seat becomes too warm, the valve 82 may be positioned as shown in FIGURE 6 and the heated air may be discharged into the passenger compartment without entering the seat cushion to any substantial extent.

In the event of extreme winter conditions, it is possible to position the valve 82 as shown in FIGURE 7 and with operation of the heater 32 and proper positioning of the valves 54 and 56, all the heated air may be forced by the blower 40 through the conduits 50 and 52 to the windshield defroster nozzles.

It is to be noted that the heating operation is effective and positive whether the automobile concerned be an airtight sedan or a convertible with the top down. As for the cooling operation, the circulating system must be closed to some extent at least in the event the evaporator effect is to be enjoyed. It will be appreciated, however, that a pronounced cooling effect may be had in an open convertible with the valves positioned as in FIGURE 3 and no evaporator being operated. Perspiration removal, by itself, gives rise to a pronounced cooling effect.

The system is applicable to any type of seat cushion providing that it be made permeable as by the use of permeable or porous material such as fibrous material or perforated tubes or plastic with continuous pores.

An installation, such as a sedan with its full seat, needs only adequate control valves and proper baffling to acquire adjustments in required air flow or air distribution. The adjustments may also be made to shut off that portion or portions of cushions not in use.

I claim:

1. A method of subjecting the person of an occupant of a seat portion in an automotive compartment to the temperature modulating effect of a flow of air, said method comprising selectively forcing air to flow by blower means from said compartment free of the influence of an air heater and in paths contiguous to said person and immediately from about said person into the interior of said seat portion in one direction while imparting a cooling effect on said person, and forcing air to flow by blower means through a heater and in the opposite direction outward from said seat portion interior while imparting a heating effect on said person.

2. A heating and cooling system associated with a passenger compartment in a vehicle, a permeable seat portion in said compartment, said seat portion being adapted to sustain a person, a heater core, an evaporator core, duct means connecting said heater core and evaporator core to the interior of said permeable seat portion and adapted to direct air flow through the latter and also simultaneously and intimately about said person, blower means in said duct means to effect air flow in the latter, valve means in said duct work between the said blower means and said seat portion whereby air may be directed in two paths, one of said paths being from the interior of said seat portion and through said blower means and evaporator core to said compartment to effect cooling of said person, and the other path being from said blower means and heater core, into said seat portion interior and then outward from the latter to said compartment to effect heating of said person.

3. A heating and cooling system associated with a passenger compartment in a vehicle, a permeable seat portion in said compartment adapted to sustain a person, a heater-core, duct means connecting said heater core to the interior of said permeable seat portion, blower means in said duct means, valve means in said duct work whereby air may be directed in two paths, one of said paths being from the interior of said seat portion and through said blower means to said compartment to effect cooling of said person, and the other path being from said blower means heater core and seat portion interior to said compartment to effect heating of said person.

References Cited in the file of this patent

UNITED STATES PATENTS

| | | |
|---|---|---|
| 1,344,057 | Moore | June 22, 1920 |
| 1,475,912 | Williams | Nov. 27, 1923 |
| 1,742,753 | Caller | Jan. 7, 1930 |
| 1,903,037 | Fraver | Mar. 28, 1933 |
| 2,103,104 | Young | Dec. 21, 1937 |
| 2,180,760 | Mayo | Nov. 21, 1939 |
| 2,286,115 | Shelton | June 9, 1942 |

FOREIGN PATENTS

| | | |
|---|---|---|
| 359,829 | Italy | June 7, 1938 |